Figure 1:
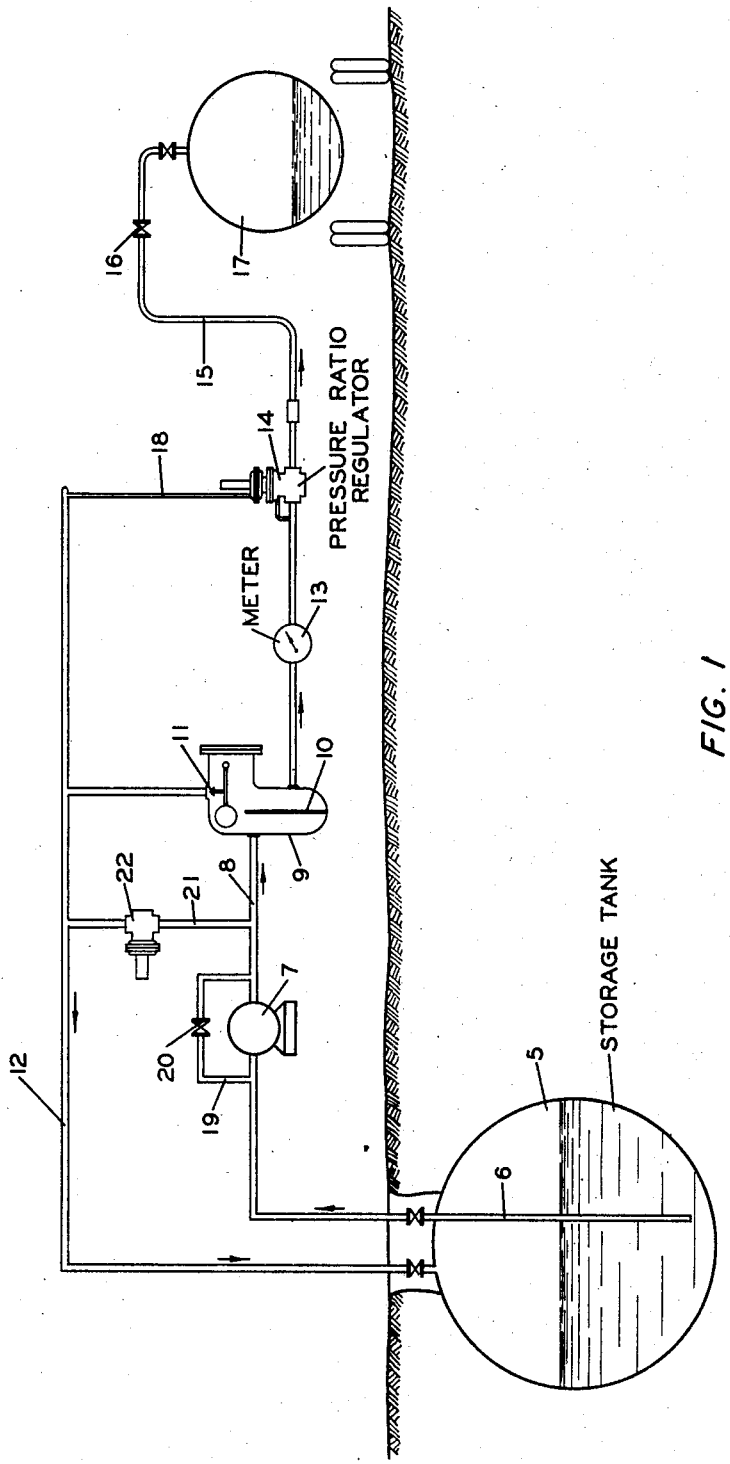

Aug. 4, 1942.  G. R. BENZ ET AL  2,291,678
DISPENSING SYSTEM FOR VOLATILE LIQUIDS
Filed Aug. 2, 1940  2 Sheets-Sheet 1

INVENTORS
G. R. BENZ
G. L. BRENNAN
BY
Hudson, Young, Shanley & Yunger
ATTORNEY

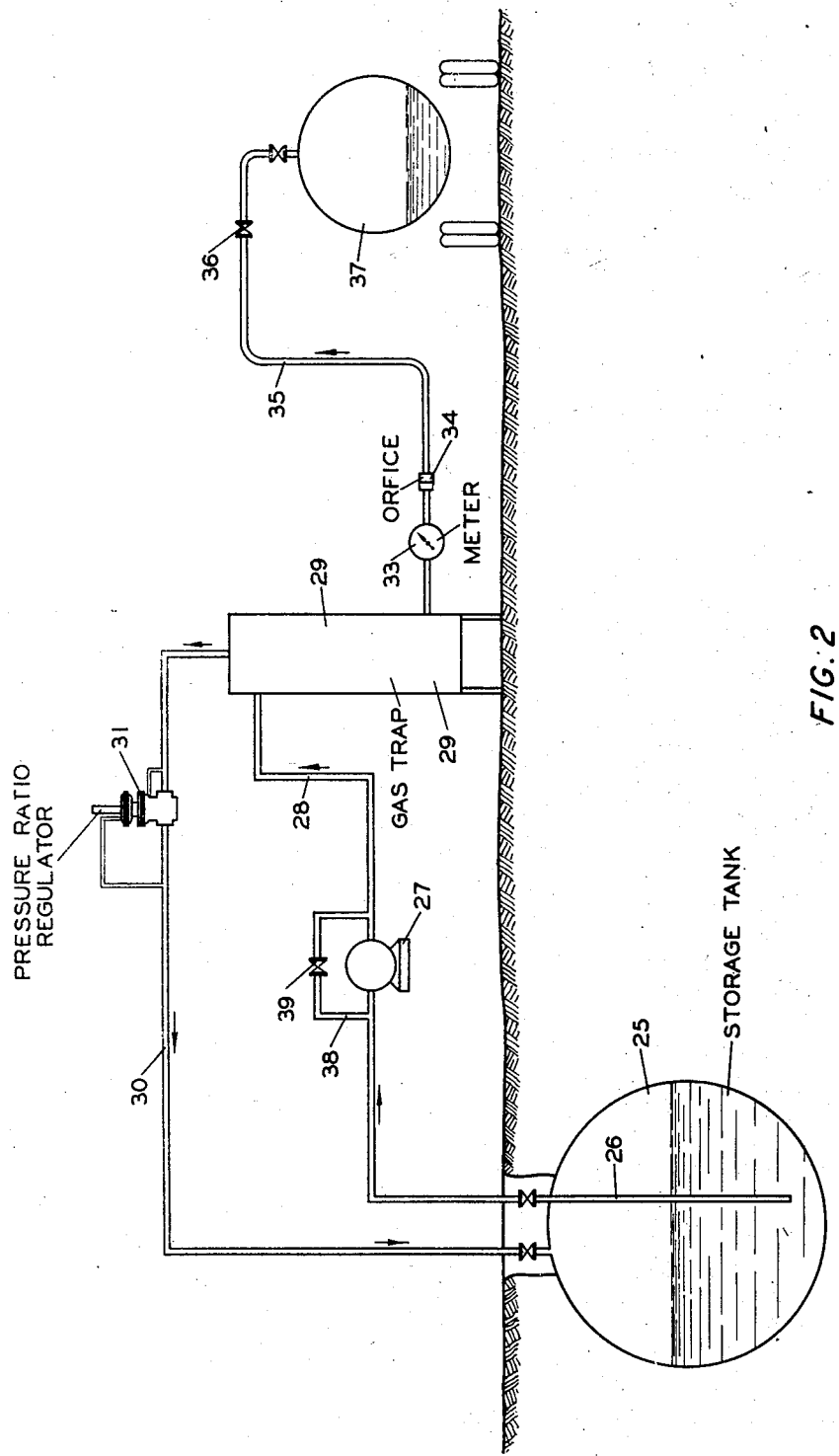

Patented Aug. 4, 1942

2,291,678

UNITED STATES PATENT OFFICE 2,291,678

DISPENSING SYSTEM FOR VOLATILE LIQUIDS

George R. Benz, Detroit, Mich., and Gerald L. Brennan, Bartlesville, Okla., assignors to Phillips Petroleum Company, a corporation of Delaware Application August 2, 1940, Serial No. 349,814

11 Claims. (Cl. 62—1)

The present invention relates to a system for dispensing volatile liquids and liquefied gases.

Liquefied gases and volatile liquids, such as propane, butane and mixtures thereof or including one or both are being marketed extensively for use as motor and domestic fuels. The volatile liquids are stored under their own vapor pressure in suitable storage tanks, either aboveground or underground, from which they are transferred to fuel tanks or containers. In metering and dispensing volatile liquids and liquefied gases in a liquid state, considerable difficulty is experienced in determining the true volume of the liquid dispensed. Piping and dispensing equipment associated with the storage tanks are subjected to atmospheric temperature conditions and have a relatively low heat capacity. Hence, such equipment may attain a higher temperature than that prevailing in the storage tank. The liquid from the storage tank tends to partially vaporize upon contact with the higher temperature equipment.

The application of conventional liquid displacement meters for determining the volume of the liquid dispensed requires that certain precautions be observed to prevent this vaporization of liquid from occurring in the meters or in the conduits leading to the meters. The presence of vapors in the meter results in the meter giving a false reading and may in some instances cause gas lock and render the meter inoperative. Liquid meters, such as those of the positive displacement type, may be used for metering the volume of liquid dispensed if the pressure at which the liquid is measured exceeds the vapor pressure corresponding to the temperature at which the liquid is measured.

These meters may be used in conjunction with a pump and a back pressure regulator. Liquid to be dispensed is taken from the storage tank by the pump and passed to the meter at increased pressure. A back pressure regulator on the discharge of the meter maintains the pressure above the vapor pressure of the liquid. For accuracy of measurement under all conditions, the back pressure regulator must necessarily be set to maintain a pressure in the meter higher than the vapor pressure under all conditions of measurement. A back pressure regulator or relief valve set at a constant pressure must be set at some pressure higher than the extreme vapor pressure which may exist in the meter. Such a system, while effective, requires that the meter be operated at a pressure much higher than that required at normal operating temperatures and consequently, much power is wasted in pumping. The system disclosed by Francis W. Wilcox in U. S. Patent 2,049,239 is an improvement over the system just described in that the pressure maintained on the meter exceeds the vapor pressure of the liquid in the storage tank by a constant amount during pumping. The present invention is a further improvement over the system disclosed by Wilcox in that the pressure at which the liquid is metered is controlled by a pressure ratio regulator with further savings in the power consumption of the liquid pump.

An object of this invention is to provide apparatus for accurately measuring the volume of volatile liquids withdrawn from a container.

Another object of this invention is to provide a system for dispensing and metering volatile liquids, which system is responsive to changes in the vapor pressure of the liquid.

Other objects and advantages will be apparent from the detailed description and accompanying drawings which are diagrammatic elevation views showing the arrangement of apparatus for carrying out the present invention.

Referring first to Figure 1, the numeral 5 designates a storage tank for storing volatile liquids such as liquefied gases, natural gasoline, liquefied petroleum gas, and the like. A liquid eduction pipe 6 in the lower portion of the storage tank provides an outlet for the liquid to be dispensed from the tank. A pump 7 of suitable capacity draws liquid from the liquid eduction pipe 6 and discharges through the pipe 8 to a conventional gas trap 9. The gas trap is provided with a baffle 10 and a float controlled valve 11 which opens to vent gases through the pipe 12 when the accumulation of gas in the gas trap is such that the liquid drops below a predetermined level. Any gas vented by the valve 11 is returned to the vapor space of the storage tank 5 through the pipe 12. Obviously the gas trap may be omitted if desired.

Liquid passing the gas trap 9 flows through a suitable meter 13 for measurement. The meter is maintained at a pressure above the vapor pressure by the pressure ratio regulator 14. A pressure ratio regulator similar to that disclosed by Rosswell W. Thomas in U. S. Patent 1,977,925 has been found to be suitable. Liquid measured in the meter 13 passes through the pressure ratio regulator 14, the conduit 15 and the valve 16 to the receiving container 17.

The pressure ratio regulator 14 is so constructed and arranged that the pressure maintained on the meter 13 is in definite ratio to the vapor pressure in the storage tank 6. Communication is established between the pressure ratio regulator 14 and the storage tank 5 through the pipes 18 and 12.

The pump 7 may be by-passed through the pipe 19 in which is a valve 20 to control the quantity of liquid by-passed. Fluid passing the pump 7 may be returned to the storage tank 5 through the pipe 21 interconnecting the pipe 8 and the pipe 12 at a point intermediate the pump 7 and the meter 13. A differential pressure regulator 22 of conventional design is interposed in the pipe 21 and acts as a relief valve for the pump when no liquid is being metered through the meter 13. The differential pressure regulator 22 is set to allow fluid to pass through the pipe 21 when the pressure in the pipe 8 is in excess of that maintained on the meter by the pressure ratio regulator 14. Either a pressure ratio regulator, a back pressure regulator, or a relief valve, set to open at a pressure higher than that maintained by the pressure ratio regulator 14 may be used in place of the differential pressure regulator 22 if desired.

Referring to Figure 2 of the drawings, the numeral 25 designates the storage tank from which the pump 27 withdraws liquid through the eduction pipe 26. Liquid discharged from the pump 27 through the pipe 28 passes to the gas trap 29. The gas trap 29 may consist of a vertical pipe the upper end of which is connected to the vapor space of the storage tank 25 by the pipe 30 through the pressure ratio regulator 31. Here again the gas trap may be omitted. The lower portion of the gas trap 29 is connected with the meter 33. Liquid passing the meter 33 flows through an orifice 34, conduit 35, and valve 36 into the receiving container 37. The pump 27 may be by-passed through the pipe 38 and the valve 39.

The resistance to flow offered by the orifice 34, conduit 35, and valve 36 is such that the pressure at which the meter 33 operates is determined by the pressure ratio regulator 31. The flow to the receiving container 37 is restricted by the orifice and the frictional resistance in the conduit and valves to the extent that the volume of liquid passing the meter 33 at the required pressure is equal to or slightly less than the capacity of the pump. Where convenient the inherent resistance of conduit 35 and valve 36 to fluid flow may be utilized in lieu of an orifice. Any excess capacity of the pump is released by the pressure ratio regulator 31 and passed back to the storage tank through the pipe 30. Gas or vapor which may be released from the liquid in pumping tends to rise in the gas trap 29 and is returned to the storage tank through the pipe 30 along with the liquid in excess of that metered at the pressure maintained on the system by the pressure ratio regulator 31. In addition to controlling the pressure at which the liquid is metered, which is above the vapor pressure of the liquid at the meter temperature, the pressure ratio regulator 31 serves as a protection against damage to the equipment. If the pump is in operation, for example, while no liquid is being dispensed through the meter, the pressure ratio regulator 31 will open allowing the liquid to be returned to the storage tank.

The pressure ratio regulator which controls the pressure at which the liquid is metered in both modifications of this invention maintains the metering pressure above the vapor pressure of the liquid being metered and in direct ratio to the vapor pressure in the storage tank. It is to be noted that the metering temperature under extreme operating conditions may be considerably higher than the temperature of the liquid in the storage tank but that the temperature of the storage tank does tend to vary to a certain extent with variations in atmospheric temperatures. Such variations in temperature produce corresponding variations in the vapor pressure of the liquid. For example, the vapor pressure of a mixture of 50% propane and 50% normal butane varies from 40 pounds per square inch gauge at 40° F. to 72 pounds per square inch gauge at 70° F.

For the purpose of illustration it may be assumed that a mixture of 50% propane and 50% normal butane is to be dispensed under variable conditions of temperature in the storage tank and in the meter. The storage tank temperature may be variable between 40° F. and 70° F. If the piping and the meter attain a maximum temperature of forty degrees above the temperature of the storage tank, then the pressure necessary to prevent vaporization in the meter must be slightly in excess of the vapor pressure of the liquid at forty degrees above the storage tank temperature. Thus when the storage tank temperature is 40° F., the meter pressure must be in excess of the vapor pressure of the liquid at 80° F. which is about 85 pounds per square inch gauge. Similarly, when the storage tank temperature reaches 70° F., the pressure maintained on the meter must be in excess of the vapor pressure of the liquid at 110° F. which is 140 pounds per square inch gauge. The difference in vapor pressure of the liquid at 40° F. and 80° F. is about 45 pounds per square inch gauge while the difference in the vapor pressure of the liquid at 70° F. and 110° F. is 68 pounds per square inch gauge.

The system in which a constant differential is maintained between the pressure in the meter and the vapor pressure in the storage tank will be taken as the basis for comparison. If such a system is operated with a pressure differential 15 pounds per square inch greater than the maximum vapor pressure differential encountered in operation, which in this example is 68 pounds per square inch, the pressure maintained on the meter will be 83 pounds per square inch higher than the vapor pressure of the storage tank under all operating conditions. When this system is operated under conditions in which the storage tank temperature is 40° F. and the maximum temperature attained in the meter and piping is 80° F., the differential required to prevent vaporization of liquid in the meter is only slightly more than 45 pounds per square inch. Under these conditions the pump is operated at a pressure considerably in excess of that required.

The present system, in which the pressure maintained on the meter is controlled by the pressure ratio regulator, may be operated with a variable difference between the vapor pressure in the storage tank and the pressure in the meter. For example, if the pressure ratio regulator is designed to maintain a ratio of 2.2 to 1 between these pressures then the pressure differential will vary from 48 pounds per square inch to 87 pounds per square inch with changes in the temperature of the storage tank from 40° F. to 70° F. These differentials are sufficient to prevent vaporization of the 50% propane, 50% normal butane mixture under the conditions assumed in this illustration and obviously result in a saving in the power requirements in pumping the mixture. The ratio of 2.2 to 1 is used for the purpose of illustration only and is not to be taken as a limiting ratio in the practice of this invention. The ratio to be used in practice will depend upon the liquid to be dispensed, the conditions under which it is dispensed, and the variations in the vapor pressure of the liquid at the dispensing temperatures; a satisfactory ratio may be determined from consideration of these factors.

While the system herein disclosed may be used for other liquids having similar characteristics, we have found that it is especially applicable to dispensing liquefied petroleum gases. In marketing mixtures of propane and butane, many distributors change the relative proportions of each from winter to summer. This invention, therefore, is not to be limited by the foregoing example which is by way of illustration only.

We claim:

1. In a system for dispensing volatile liquids exposed to a considerable range of temperatures, the combination comprising a storage tank, a pump, a liquid meter, and means to maintain a substantially constant pressure ratio throughout the temperature range between the pressure in the meter and the vapor pressure of the volatile liquid in the storage tank.

2. In a system for dispensing volatile liquids exposed to a considerable range of temperatures, the combination comprising a storage tank, a liquid meter, and pressure responsive means adapted to maintain a substantially constant pressure ratio greater than unity throughout the temperature range between the pressure in the meter and the vapor pressure of the volatile liquid in the storage tank.

3. Apparatus for dispensing volatile liquids comprising a storage tank, a liquid meter, and means responsive to the vapor pressure in the storage tank, said means being adapted to maintain a substantially constant pressure ratio greater than unity under variable temperature conditions between the pressure in the meter and the vapor pressure of the volatile liquid in the storage tank.

4. The method of dispensing volatile liquids comprising passing the liquid through a liquid meter and maintaining a pressure in the meter proportional to the vapor pressure of the liquid under variable temperature conditions.

5. The method of dispensing volatile liquids from a storage tank comprising passing the liquid through a liquid meter and maintaining a pressure in the meter greater than and in proportion to the vapor pressure of the liquid in the storage tank under variable temperature conditions.

6. Apparatus for dispensing volatile liquids comprising a storage tank, a pump, a gas trap, a meter, a conduit connecting the gas trap with the storage tank, and means responsive to the vapor pressure in said storage tank for controlling the pressure in said gas trap.

7. Apparatus for dispensing volatile liquids comprising a storage tank, a pump, a meter, a passage between the pump and the meter, a conduit connecting said passage with the storage tank, and means responsive to the vapor pressure in said storage tank for controlling the pressure in said passage.

8. Apparatus for dispensing volatile liquids comprising a storage tank, a pump, a meter, a passage between the pump and the meter, a conduit connecting said passage with the storage tank and means associated with said conduit for controlling the pressure in said passage in accordance with changes in pressure in the storage tank.

9. Apparatus for dispensing volatile liquids comprising a storage tank, a pump, a meter, means for maintaining a pressure on the meter substantially in proportion to the vapor pressure in the storage tank under variable temperature conditions, and means responsive to the vapor pressure in the storage tank for limiting the pressure in the meter.

10. Apparatus for dispensing volatile liquids comprising a storage tank, a pump, a gas trap, a meter, means for maintaining a substantially constant pressure ratio between the pressure in the meter and the vapor pressure in the storage tank under variable temperature conditions, and means for limiting the maximum pressure in the meter.

11. In a system for dispensing volatile liquids subjected to a considerable range of temperatures the combination comprising a storage tank, a pump, a liquid meter and a pressure ratio regulator maintaining a substantially constant pressure ratio throughout the temperature range between the pressure in the meter and the vapor pressure of the volatile liquid in the storage tank.

GEORGE R. BENZ.
GERALD L. BRENNAN.